US006785822B1

(12) United States Patent
Sadhwani-Tully

(10) Patent No.: US 6,785,822 B1
(45) Date of Patent: Aug. 31, 2004

(54) SYSTEM AND METHOD FOR ROLE BASED DYNAMIC CONFIGURATION OF USER PROFILES

(75) Inventor: Bharati Hemandas Sadhwani-Tully, Fishers, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,239

(22) Filed: Sep. 16, 1999

(51) Int. Cl.[7] .......................... G06F 9/24; G06F 12/16; H04L 9/00; G09G 5/00
(52) U.S. Cl. ...................... 713/201; 345/741; 345/747; 713/1; 713/166; 713/200
(58) Field of Search ................................ 713/200, 201; 707/9, 10; 345/762, 763, 741, 742, 743, 744

(56) References Cited

U.S. PATENT DOCUMENTS

| | | | | |
|---|---|---|---|---|
| 5,001,628 A | * | 3/1991 | Johnson et al. ............... | 707/10 |
| 5,113,442 A | * | 5/1992 | Moir .......................... | 713/167 |
| 5,560,008 A | * | 9/1996 | Johnson et al. ............. | 713/201 |
| 5,675,782 A | * | 10/1997 | Montague et al. .......... | 713/201 |
| 5,720,033 A | * | 2/1998 | Deo ........................... | 713/200 |
| 5,764,889 A | * | 6/1998 | Ault et al. ................... | 713/200 |
| 5,794,001 A | * | 8/1998 | Malone et al. .............. | 345/762 |
| 5,881,225 A | * | 3/1999 | Worth ......................... | 713/200 |
| 6,101,607 A | * | 8/2000 | Bachand et al. ............ | 713/201 |
| 6,356,863 B1 | * | 3/2002 | Sayle .......................... | 703/27 |
| 6,448,981 B1 | * | 9/2002 | Kaczmarski ................ | 345/763 |
| 6,457,130 B2 | * | 9/2002 | Hitz et al. ................... | 713/201 |
| 6,513,111 B2 | * | 1/2003 | Klimczak et al. ............. | 713/1 |

FOREIGN PATENT DOCUMENTS

| | | | | |
|---|---|---|---|---|
| JP | 06-075913 | 3/1994 | ........... | G06F/15/00 |
| JP | 07-182289 | 7/1995 | ........... | G06F/15/00 |
| JP | 10-011398 | 1/1998 | ........... | G06F/15/00 |

OTHER PUBLICATIONS

Marc J. Rochkind, "Advanced UNIX Programming," 1985, p. xii and pp. 4–12.*
Brian W. Kernighan et al., "The UNIX Programming Environment," 1984, pp. 52–57.*
David James Clarke, IV, "Novell's LAN Study Guide IntranetWare/NetWare 4.11," 1997, pp. 344–350, 371–388, 410–420.*
Andrew S. Tanenbaum, "Operating Systems: Design and Implementation," 1987, pp. 284–297.*
System Administrator's Guide; Tivoli Service Desk 5.1; Chapter 3: Configuring Profiles; pp. 47–86, Jul. 1998.

* cited by examiner

Primary Examiner—Gregory Morse
Assistant Examiner—Matthew Heneghan
(74) Attorney, Agent, or Firm—Duke W. Yee; David A. Mims, Jr.; Wayne P. Bailey

(57) ABSTRACT

Initially, profiles are customized by naming an assignment to individual users and identifiable groups of users. A profile is further assigned action groups that comprise one or more system actions. System actions provide the functionality needed for toolbar buttons and menu items. Using the system actions associated with the action groups, toolbar buttons and menus can then be configured for the profile. The profile determines the level of functionality downloaded with the application. When a request is received for an application, the user's profile is accessed for the action groups and system actions that provide functionality for the application. Only system actions associated with a profile to which the user is assigned are transferred to the requesting user. Alternatively, the user's group profile may be accessed for the action groups and system actions that provide functionality for the application.

42 Claims, 9 Drawing Sheets

SYSTEM AND METHOD FOR ROLE BASED DYNAMIC CONFIGURATION OF USER PROFILES

BACKGROUND OF THE INVENTION

1. Technical Field

The present invention relates to information processing technology. More particularly, the present invention relates to the configuration of profiles based on roles.

2. Description of Related Art

Throughout the business environment, software applications directed toward service and support operations are being bundled into suites of management solutions. These comprehensive software solutions maximize the efficiency and effectiveness of a corporate service and support operation. A typical suite may consist of several integrated applications that help manage functions that are critical to an organization's infrastructure. By deploying such a suite to optimize the relationship between IT (information technology) and its internal customers, an enterprise is better able to understand and manage the complex relationships between user problems, network events, corporate assets, and changes to the IT infrastructure.

System integrity and security are always concerns for corporations. System integrity is threatened when users without the needed training or skill level gain access to sophisticated processes and system components. A person having less than the necessary competence can easily disrupt an entire system by unknowingly reconfiguring critical system components. System security is threatened when an unauthorized person gains access to sophisticated processes and system components. An unauthorized person could sabotage an entire system, reconfiguring and/or deleting critical system components. Equally important, an unauthorized person could gain access to privileged information.

It would be advantageous to provide a means for reducing the access of unauthorized users to critical system functions. It would further be advantageous to provide a means for allowing access to authorized persons to critical system functions. It would be even more advantageous to provide means to reduce access of system functions to some users while allowing other users more access to system functions.

SUMMARY OF THE INVENTION

The present invention relates to a system and method for configuring profiles that grant functionality. The grant of functionality allows the system administrator to increase system security by limiting access to functionality from specific groups or users. Initially, profiles are customized by naming and assignment to individual users and identifiable groups of users. A profile is further assigned action groups that comprise one or more system actions. System actions provide the functionality needed for toolbar buttons and menu items. Using the system actions associated with the action groups, toolbar buttons and menus can then be configured for the profile. The profile determines the level of functionality downloaded with the application. When a request is received for an application, the user's profile is accessed for the action groups and system actions that provide functionality for the application. Only system actions associated with a profile to which the user is assigned are transferred to the requesting user. Alternatively, the user's group profile may be accessed for the action groups and system actions that provide functionality for the application. If no profile is available for the user or the user's group, a default profile may be accessed for the action groups and system actions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
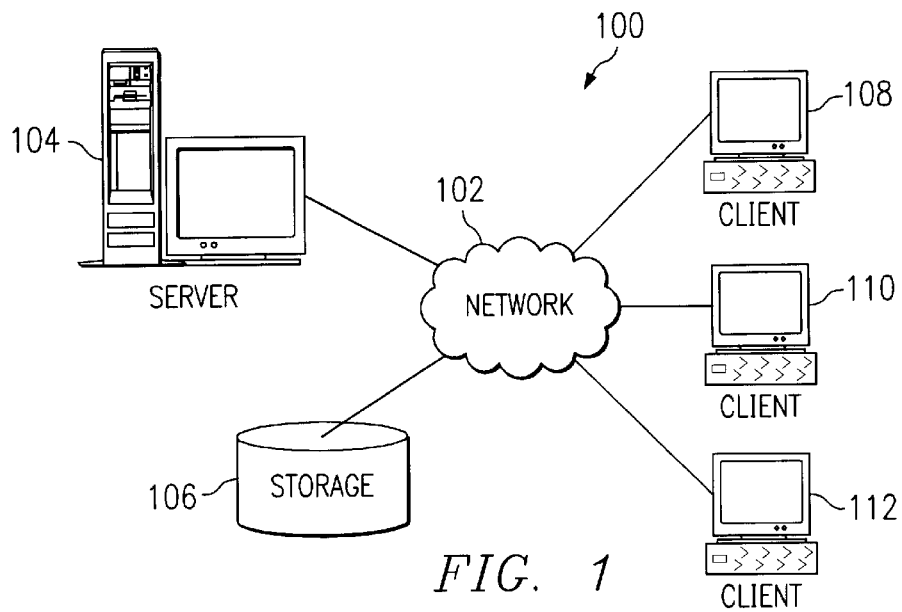
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 may be on the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
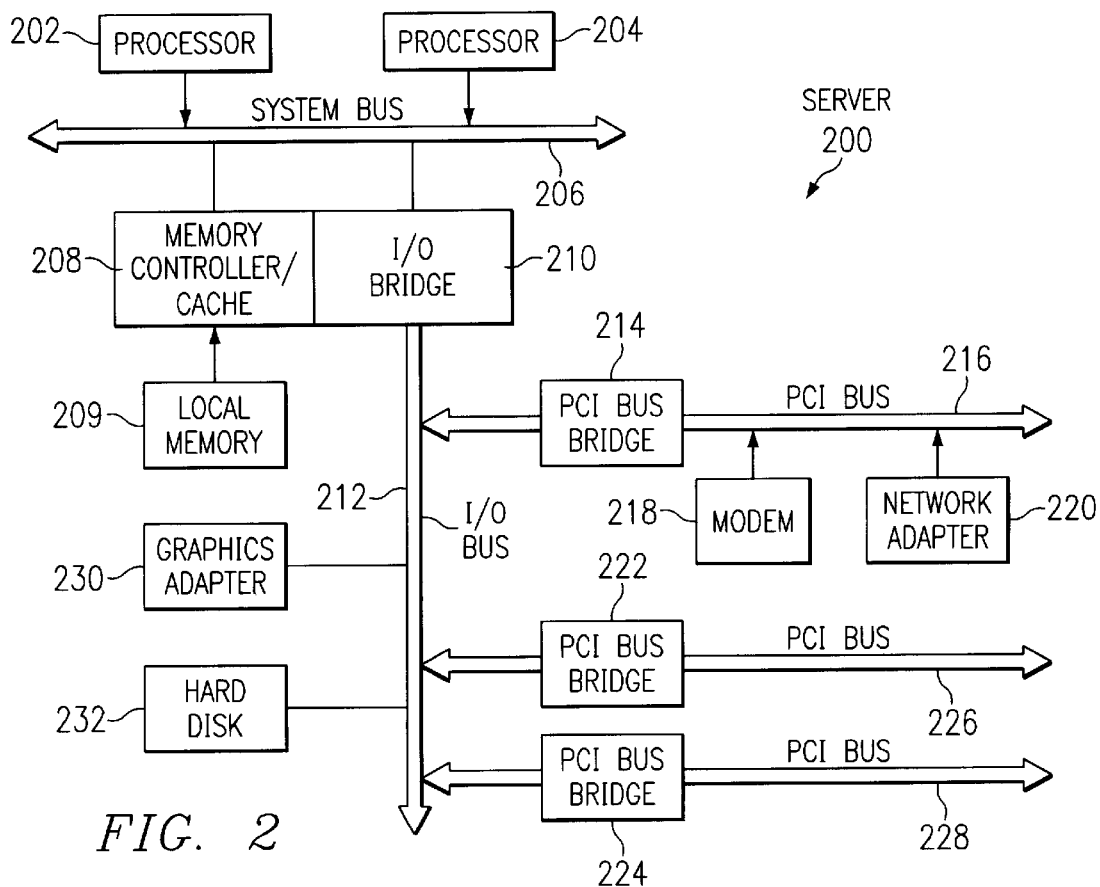
FIG. 2 is a block diagram depicting a data processing system that may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
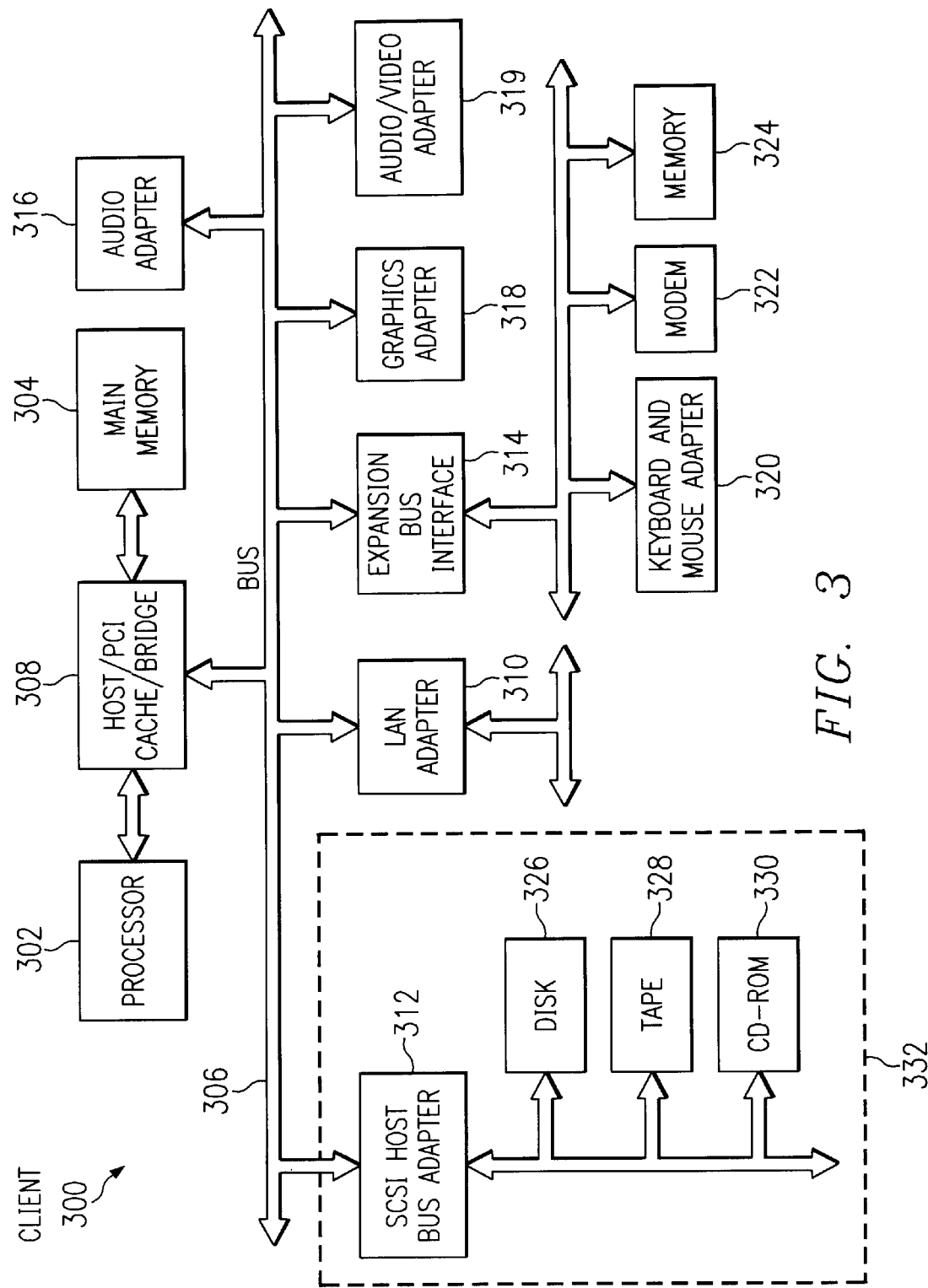
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as the Micro Channel bus and ISA bus, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include the OS/2 operating system. An object oriented programming system, such as the Java system, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

In accordance with a preferred embodiment of the present invention, profiles and security rights enable system administrators to control access to a suite of management solutions. Profiles control which system actions appear in the menu and toolbar for a user. When a user logs in to any of the management solutions applications, a toolbar and menu appear that correspond to the profile assigned to that user. The user sees only the menu commands and toolbar buttons belonging to the assigned profile. More importantly, only the system actions associated with the user's profile are loaded to the user's local computer. If the user does not have a profile, the management solutions software uses a profile assigned to a default group to which the user belongs. In that case, only the system actions associated with the user's default group are loaded to the user's local computer. If this default group does not have a profile, the system uses a default system profile. Again, only the functionality of the default profile, i.e. the system actions associated with the default profile, are loaded to the user's local computer. If neither the user profile nor group profile for the user can be found, and a default system profile has not been designated, the user cannot receive any system action associated with any of the management solutions applications.

It is important to understand that the system administrator may fashion the security rights in any manner. For instance, configuring the default profile with every available system action while limiting access to certain groups and individuals to certain system actions by assigning those groups and individuals to profiles having fewer system actions.

According to a preferred embodiment of the present invention, profiles contain action groups, system actions, a toolbar, and menus. An action group is a collection of related system actions. A profile must contain one or more action groups. For example, a problem management administrator profile may contain a diagnostic administration action group that includes all the system actions necessary to maintain and configure diagnostic aids.

System actions invoke script routines. System actions can also run external applications, such as word-processing or spreadsheet programs. Also, security rights can be specified for any system action. A user must have the required rights in order to invoke a system action. A custom toolbar can be created for each profile. System actions appear as toolbar buttons on this custom toolbar. Similar to custom toolbars, custom menus can also be created for each profile. In a menu, system actions appear as menu commands. The order of the menus and the names of the menus and commands are specified when configuring a profile.

Typically, configuring a profile is performed by using a specialized profile editor tool bundled with the management solutions applications. An example is "Tivoli Service Desk," available from Tivoli Systems Inc., 9442 Capital of Texas Highway, Austin, Tex. Generally, the supporting application must be up and running prior to using the profile editor to create, customize and maintain profiles; however, the profile editor can usually be run independently of the supporting application or as a system action on a menu or toolbar, which will be discussed in detail below.

Figure 4:
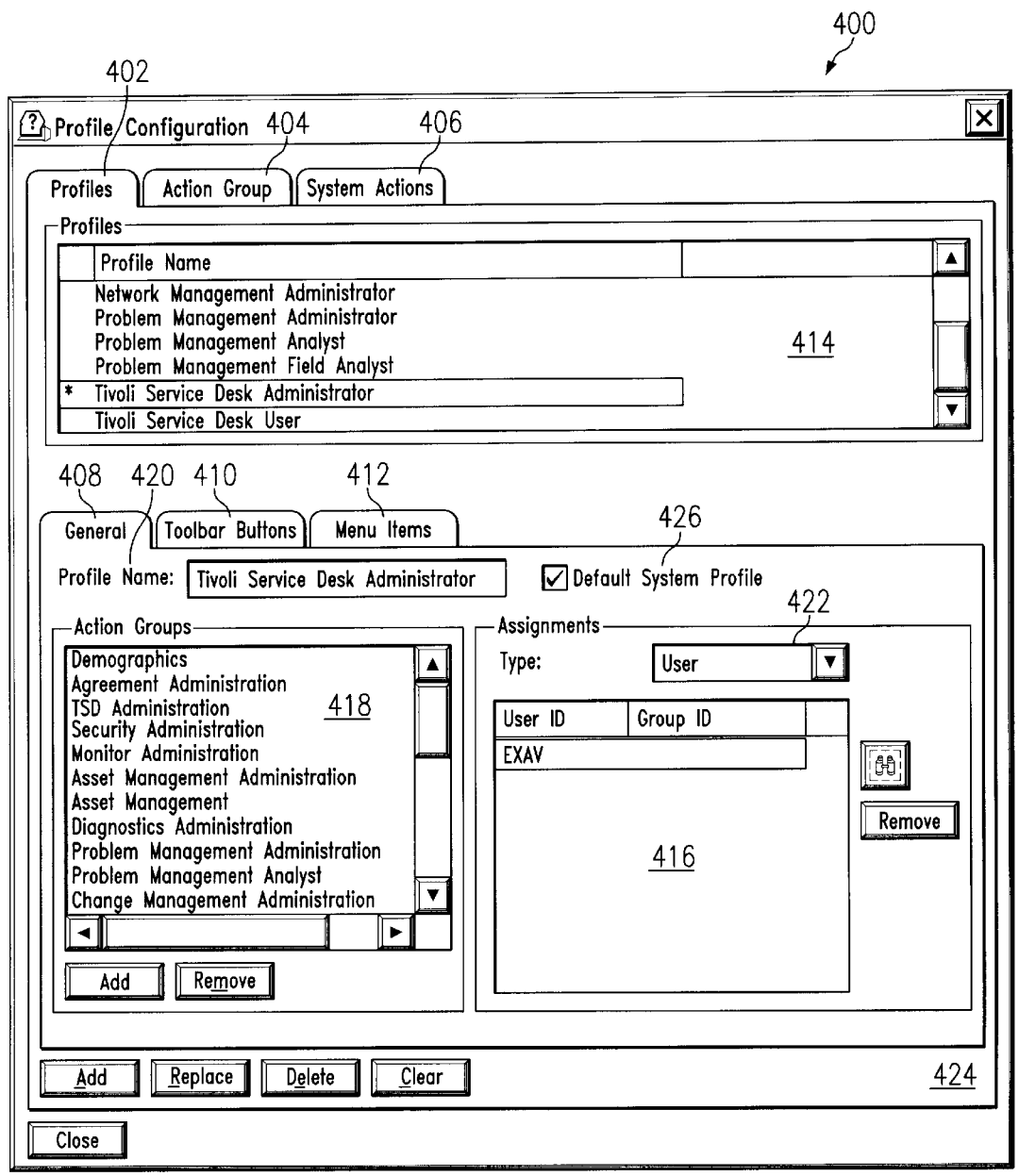
FIG. 4 depicts a screen shot of a profile editor showing profile configuration dialog box 400, which is used for configuring all the elements that make up profiles.

Although many configurations of a profile editor are possible, FIGS. 4 through 8 depict screen shots of a configuration dialog box for a profile editor in accordance with a preferred embodiment of the present invention. FIG. 4 depicts a screen shot of a profile editor showing profile configuration dialog box 400, which is used for configuring all the elements that make up profiles.

Dialog box 400 contains several index tabs for accessing information concerning each element that makes up a profile. These tab options include profiles tab 402, action group tab 404, and system actions tab 406. In the depicted example, profiles tab 402 has been selected and the user is presented with three profiles option tabs for configuring a specific profile.

The general options under general tab 408 are shown in FIG. 4. The profile editor is used for assigning specific users and groups to profiles in dialog box 400. Using this presentation, the user can select an existing profile from profiles list 414, such as "Tivoli Service Desk Administrator." Importantly, the initial running of the profile editor is from the operating system level; subsequent executions of the profile editor require that the system administrator's profile be assigned an action group containing the profile editor. In an alternate embodiment, a default profile is pre-configured, thereby eliminating the need to run the profile editor from the operating system. Instead an application is started and the profile editor assessed in the normal manner.

The general information associated with the selected profile is then displayed, starting with the name of the selected profile in profile name box 420. A profile may be designated as a default profile by selecting default system profile box 426. Default profiles are only used when a user's identification and group identification have not been assigned to a profile, even though the user's identification and password are valid for the suite of management solutions applications.

Action groups belonging to the profile are presented to the user in action groups list 418, and individual action groups may be added to the action group list belonging to a profile or removed from the list, by using list buttons 424. Groups and users may be assigned to a selected profile by designating either user or group type in type box 422, selecting the browse button to select users or groups which will be returned to identification box 416. The user may also configure toot bar buttons and menu items by selecting tool bar buttons tab 410 or menu items tab 412.

Figure 5A:
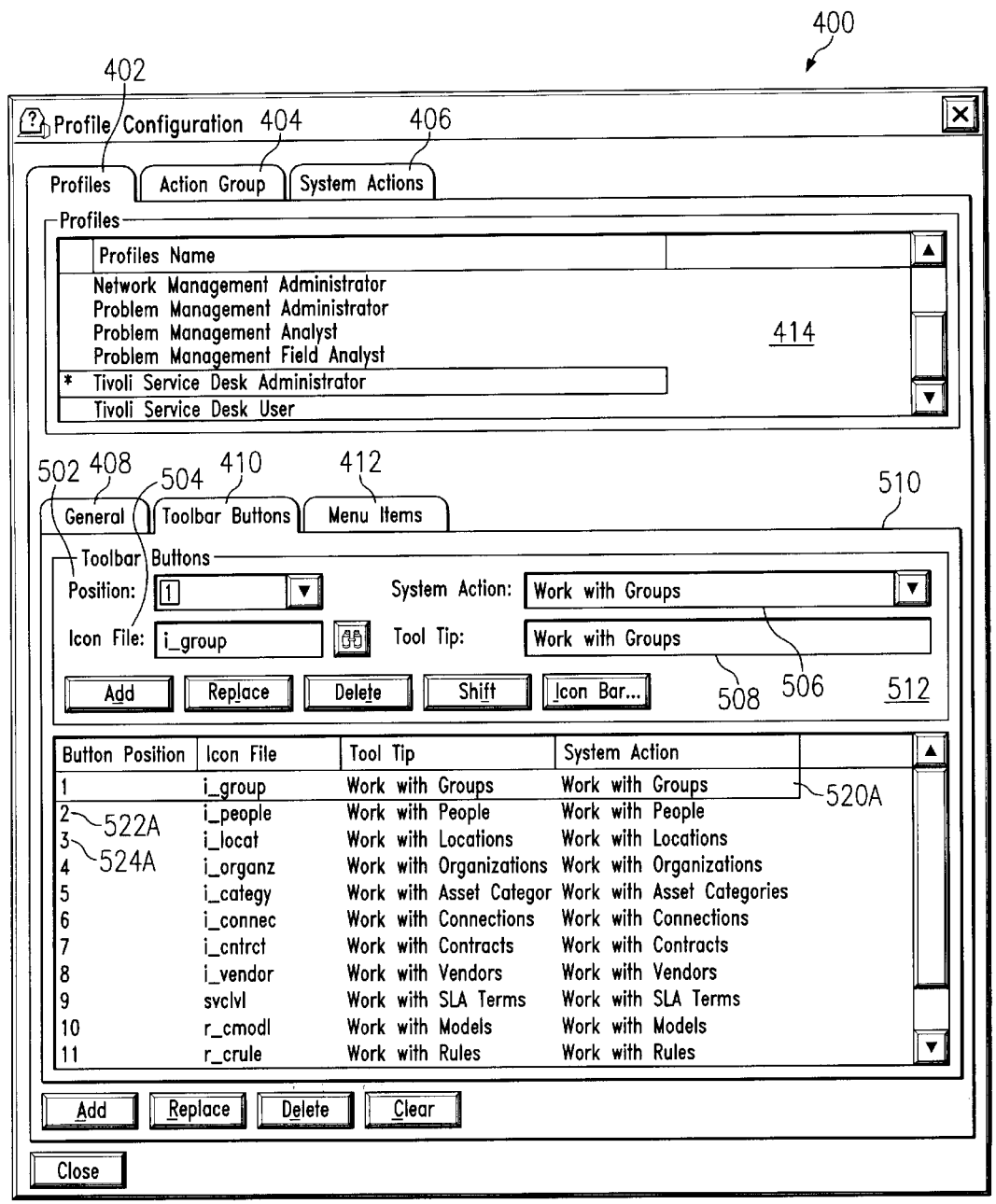
FIG. 5A illustrates profile configuration dialog box 400, where the user has selected tool bar buttons tab 410.

FIG. 5A illustrates profile configuration dialog box 400, where the user has selected tool bar buttons tab 408. Here, the profile selected by the user in profile list 414 remains "Tivoli Service Desk Administrator." By activating tool bar buttons tab 410, the system administrator is presented with a display of customizable options for each tool bar button. Toolbar tab 410 allows an authorized user of the profile editor to create, customize and maintain toolbars. Toolbar buttons are configured that appear in a selected user's profiles. The profile editor user may also configure the icon that appears on each toolbar button and define which system action is invoked by a toolbar button. As is well known in the art, toolbar buttons provide shortcuts for frequently needed system actions. Toolbar button positions are numbered from left to right. Each profile may have an associated toolbar because each profile must have associated action groups. Conversely, toolbars do not exist independently of profiles.

After designating a profile in profile list 414, the toolbar button attributes associated with the selected profile are listed in button list 510. Each entry in button list 510 contains the current options associated with each button on the toolbar for the selected profile. A user may edit the toolbar buttons by entering new option values and selecting the proper action from button action buttons 512.

For the selected profile identified (shown as highlighted) in profile list 414, the system administrator may position a button on the toolbar by using position box 502 and/or select an icon from icon file box 504 for entry on the toolbar. The user may also select a system action type to associate with the toolbar button from system action list 506. Toolbar buttons can be added for any system action already assigned to the profile but not for a system action that does not belong to the selected profile. In this case, the user has selected a system action of work with the groups in system action list 506. Finally, the tool tip that describes the system action is entered in tool tip box 508.

Figure 5B:
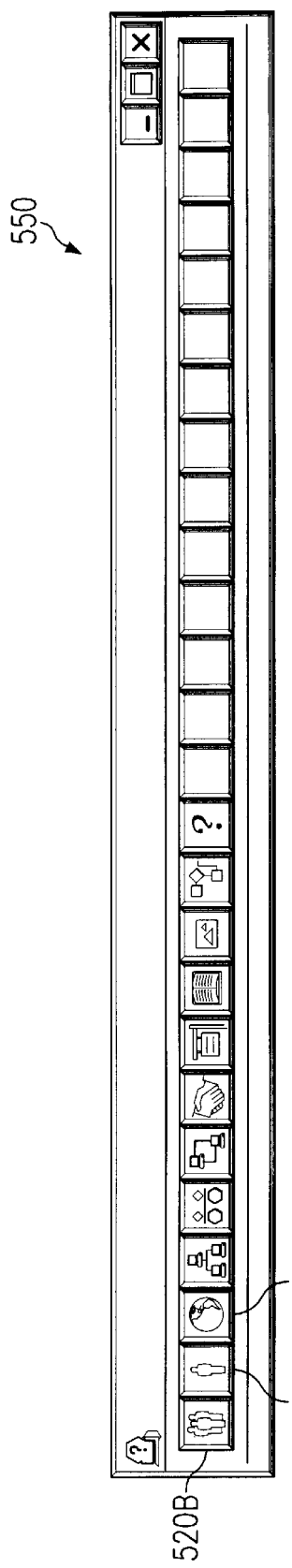
FIG. 5B illustrates a typical tool bar 550, which has been created using tool bar buttons tab 410, and is presently listed in the tool bar buttons list 510 on FIG. 5A.

FIG. 5B illustrates a typical tool bar 550, which has been created using tool bar buttons tab 408 and is presently listed in the tool bar buttons list 510 on FIG. 5A. Note that button list 510 (in FIG. 5A) contains four columns, one for each of the four changeable attributes discussed above.

In a depicted example, button list 510 contains twelve entries for configuring tool bar buttons on tool bar 550. The twelve entries in tool bar buttons list 510 correspond to the first twelve buttons on tool bar 550. For example, buttons identified at rows 520A, 522A and 524A correspond to buttons 520B, 522B and 524B, respectively. Of course, the user is free to configure any number of buttons which may be represented on tool bar 550, which are used for invoking the corresponding system actions defined in system action box 506 of FIG. 5A.

Figure 6B:
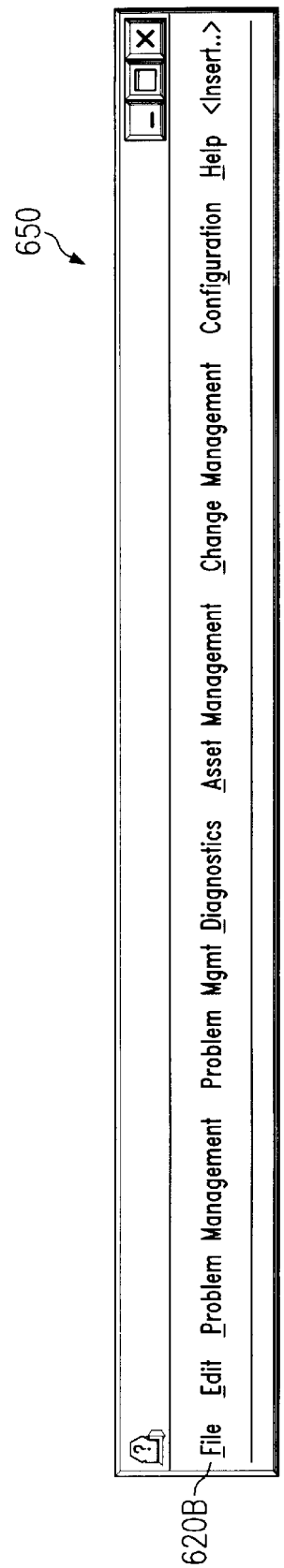
FIGS. 6A and 6B depict profile configuration dialog box 400, where the user has selected menu items tab 412.
Figure 6A:
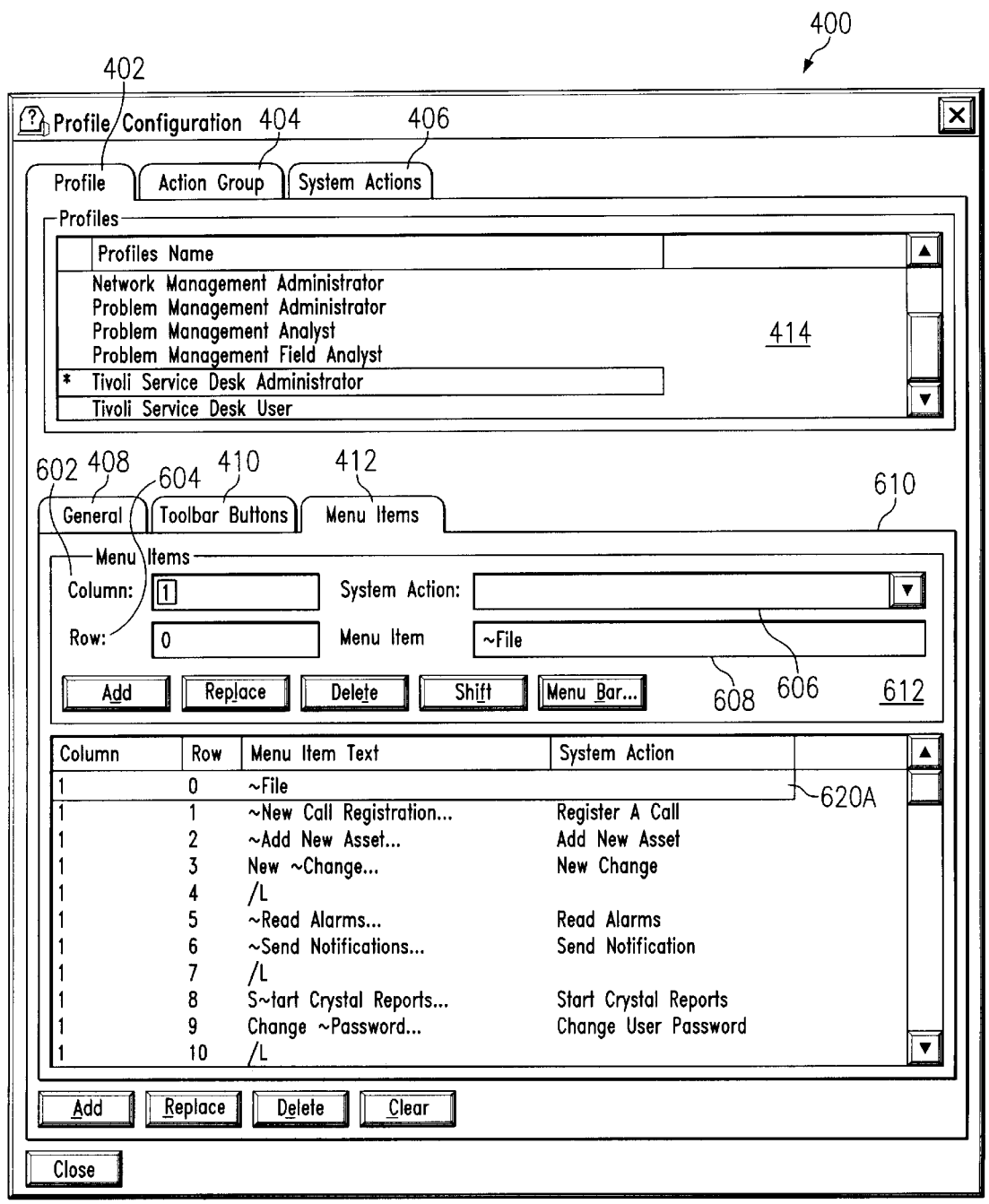

FIGS. 6A and 6B depict profile configuration dialog box 400, where the user has selected menu items tab 412. Menu items tab 412 gives a system administrator the means for creating, customizing and maintaining menu bars. In the depicted example, the user's profile selection remains "Tivoli Service Desk Administrator," as shown in profiles list 414. However, by selecting menu items tab 412, the menu items options are opened for each menu item displayed on the menu bar. The options are similar to those discussed above with respect to FIG. 5A in that the user may select a column position for placing a menu item with column box 602 and a row position for placing the menu item on a specific row in row box 604.

Menu items define the menu names and menu commands that appear in the menu bar, such as that shown at 620B in FIG. 6B. A user can design a custom menu bar for each system profile in much the same manner as toolbars were created above. In the depicted example, "~File" menu item 620A (shown in FIG. 6A) has been selected by the user from menu item list 610 and is displayed in menu item box 608. Menu items may be added or deleted from the menu bar using action buttons 612.

The column and row position of the menu item appearing in menu item list 610 are displayed in column box 602 and row box 604. Menu column numbers represent the order in which the menus appear. Menus are numbered from left to right. System actions associated with the menu item are displayed in system action box 606. The user assigns a menu item for each menu name that appears in menu bar 650 and also assigns a menu item for each menu command that appears in these menus. These actions are performed using action buttons 612. Each system action assigned to the profile may be represented by a menu item.

FIG. 6B depicts menu 650, generated from menu items tab 412 and listed in menu item list 610 for the currently selected profile of "Tivoli Service Desk Administrator," listed above in profiles list 414 (shown in FIG. 6A). Menu bar 650 is depicted with eight menu items in each of the eight columns presented. Menu items include "File" and "Edit," to "Help." Each of these menu items is expandable, as is well known in the art, and may contain a number of different menu items associated with the menu item illustrated in menu 650.

Menu item list 610, depicted in FIG. 6A, illustrates the menu items for the first column. For instance, menu item "File" is listed in the column 1, row 0 position (as specified in the Column and Row fields shown in menu item list 610 of FIG. 6A) and can be seen as the first item in menu bar 650. Other menu items include "New Call Registration", "Add New Asset", and "New Change" in the 1, 2 and 3 row positions, respectively. These menu items are contained in a drop down menu associated with the "File" menu item. The drop down menu associated with the "File" menu item is expanded by activating "File" or the menu bar, as is well known in the art.

Figure 7:
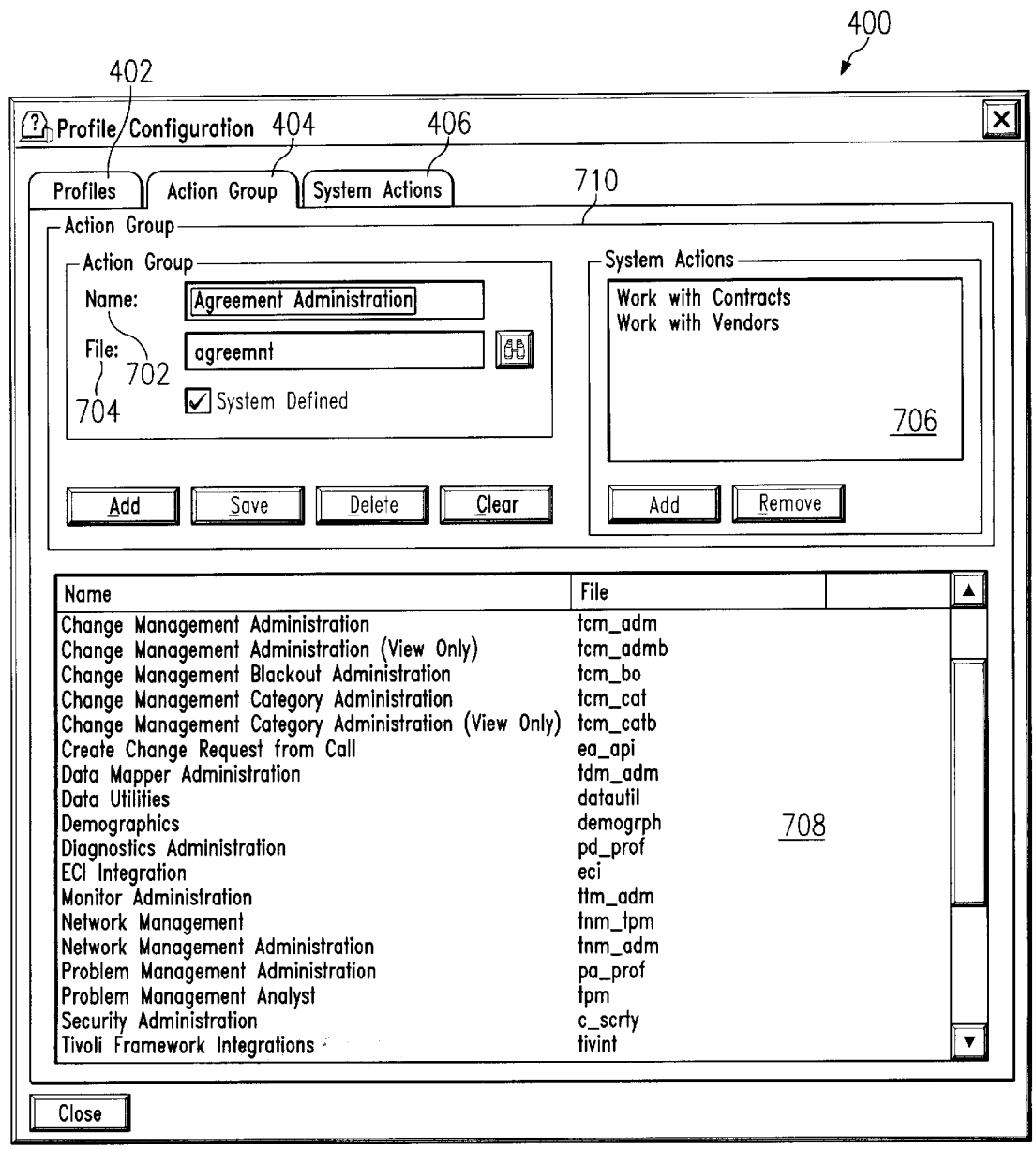
FIG. 7 depicts profile configuration dialog box 400, where action group tab 404 has been activated by the user.

FIG. 7 depicts profile configuration dialog box 400, wherein action group tab 404 has been activated by the user. Action group tab 404 allows the user to create and modify action groups. Action groups are collections of related system actions and are used to define which system actions are available to the users and groups assigned to a profile. Action groups also control which action files are loaded at run time. Only the action files referenced in the main action file of each action group are loaded. Each profile contains one or more action group. A user may assign any action group to any profile in order to grant access to specific system actions for designated users and groups.

The action group depicted in FIG. 7 contains related system actions and may be associated with a profile along with other action groups. By activating action group tab 404, action group list 708 is presented, allowing the user to view and select action groups. A selected action group is then displayed in name box 702, along with the main action file in file box 704. The main action file "agreement" shown in file box 704 contains references to action files which contain all system actions associated with the action group. In this case, the system actions referred to in the main action file are listed in system actions list 706 and include "Work with Contracts" and "Work with Vendors". Of course, a user may configure a previously undefined action group by entering information relating to the action group in action group box 702 and action file box 704 and adding the desired system actions in system actions list 706. However, the main action file might need code customizations in order to invoke each of the action files that form the independent system actions. The newly configured action group can then be added to action group list 708 using action buttons 710.

Figure 8:
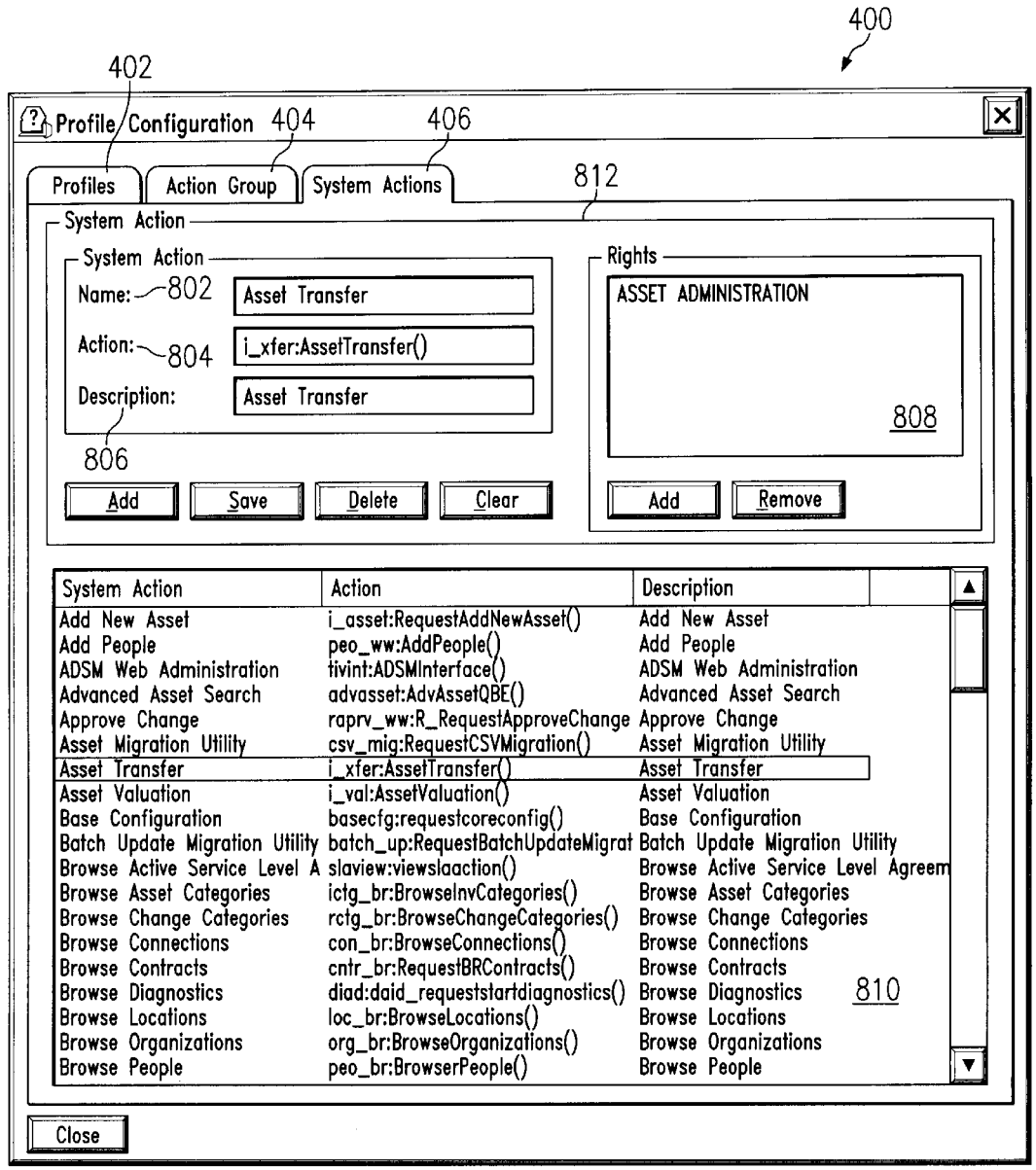
FIG. 8 illustrates profile configuration dialog box 400, where the user has selected system actions tab 406 for operating system actions.

FIG. 8 illustrates profile configuration dialogue box 400, where the user has selected system actions tab 406 for operating on system actions at 812. System actions run action scripts, routines or external applications, such as word processing programs. A user can add system actions to action groups as discussed immediately above. The user can then assign these action groups to profiles as described further above. Merely adding a system action to an action group is not enough to make the system action work. The name of the system action's action file must be added to the main action file. Security rights can be assigned to system actions. Once requested, system actions can appear as toolbar buttons or menu selections.

In the depicted example, system action list 810 displays all previously configured system actions. Note that, in this example, the user has selected "Asset Transfer" from system action list 810. The information provided in list 810 is also presented in entry boxes above the list in order to facilitate customizing the selected system action. There, the user can customize the name by modifying system action name box 802, customize the action script or path by modifying action box 804, customize the description of the action in description box 806, and finally, customize the security rights that are assigned to the system action in rights box 808.

Other configuration dialog box schemes are possible. The present scheme is not meant to demonstrate the only possible presentation scheme; however, the present example does depict a preferred presentation scheme.

In accordance with a preferred embodiment of the present invention, the above described functionality may be used for increasing security by configuring profiles and security rights which enable system administrators to control access to a suite of management solutions.

Figure 9:
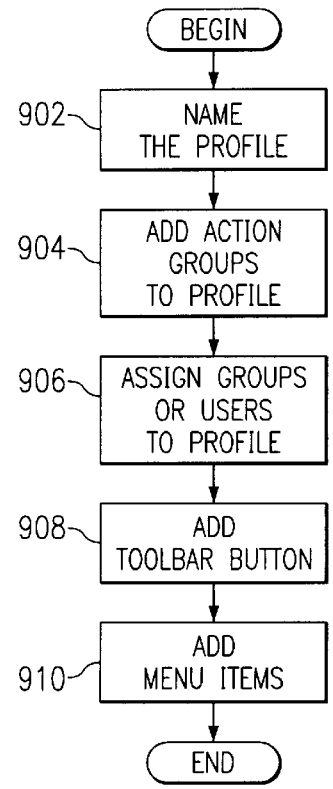
FIG. 9 depicts a flowchart in accordance with a preferred process for configuring a profile.

Referring now to FIG. 9, a flowchart is illustrated, depicting a process for configuring profiles in accordance with a preferred embodiment of the present invention. The process begins with a user, such as a system administrator, naming a profile to be configured (step 902). The profile name is entered in profile name box 420 (shown in FIG. 4). Next, the system administrator adds action groups to the profile (step 904). This is easily accomplished by choosing "Add" action button 422 under action group list 418. Then, from the resulting dialog, the user selects one or more action groups, and it/they is/are returned to action groups list 418.

Next, the system administrator assigns a user or group to the profile (step 906). To avoid confusion among users and administrators, a user can be assigned to only one profile. The last assigned profile becomes the default profile for the user, and the user is removed from any other profile.

Returning again to FIG. 4, a user or group type is selected from type list 422. When the browse button is selected, a list of users or groups is available for selection based on the type. The selected items are returned to the user and group list 416. In so doing, only the groups and/or individuals assigned to the profile have access to the functionality configured within the profile.

A tool bar is then configured by adding toolbar buttons to the toolbar (step 908). Buttons are added as described above with respect to FIGS. 5A and 5B. Finally, a menu bar is configured by adding menu items to the menu bar (step 910). Menu items are added as described above with respect to FIGS. 6A and 6B.

The benefit of configuring a profile in accordance with a preferred embodiment of the present invention can be more completely understood with the description of the following process, employed for accessing a profile.

Figure 10:
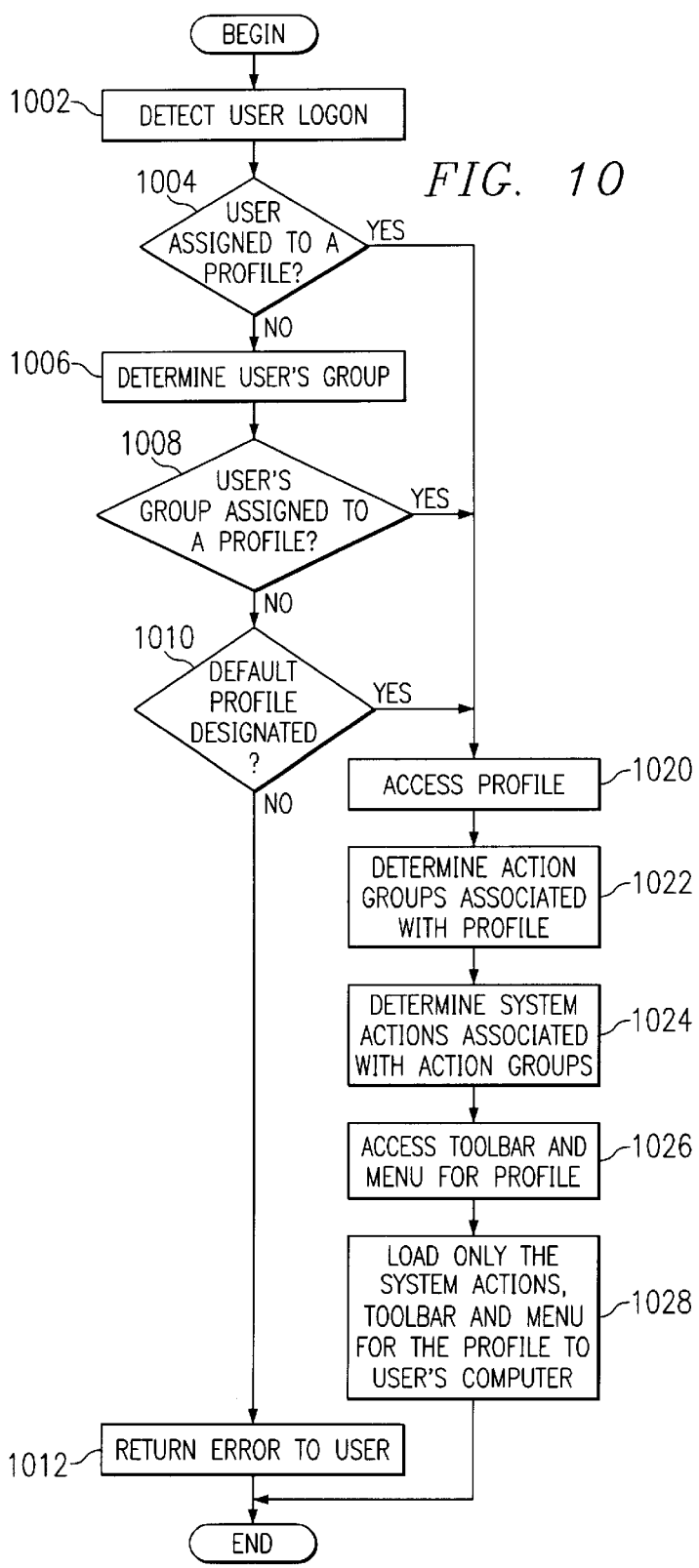
FIG. 10 is a flowchart depicting a login process in accordance with a preferred embodiment of the present invention.

FIG. 10 is a flowchart depicting system access in accordance with a preferred embodiment of the present invention. The process begins with the detection of a user login (step 1002). It is assumed that the user has been authorized access to at least some of the applications within the suite of management solutions.

Next, a determination is made as to whether the user is assigned to a profile (step 1004). If the user is assigned to a profile, the profile is accessed (step 1020). User authorized action groups are ascertained from the profile (step 1022). System actions associated with the action groups are then determined (step 1024). While this may seem to be a sub-step of determining the action group, it should be understood that, in accordance with a preferred embodiment of the present invention, security rights are acquired at the system action level. Therefore, there may be a case where a user or group is denied access to certain functionality associated with a system action while being granted authorization to the remainder of the action group. The toolbar and menu having the buttons and menu items associated with the system actions are then accessed (step 1026). As a practical matter, the toolbar and menu may be accessed directly through the profile. Finally, only the system actions in the user's profile are loaded to the user's local computer (step 1028). The process then ends with the functionality for which the user is authorized being downloaded, i.e. the profile to which the user has been assigned.

Returning to step 1004, if the user is not assigned to a profile, the default group to which the user has been assigned can be determined from the user's ID (step 1006). A determination is made as to whether the user's group is assigned to a profile (step 1008). If the user's group is assigned to a profile, the process again flows to step 1020, where the profile is accessed. From the profile, the action groups associated with the profile are determined (step 1022). System actions associated with the action groups are then determined (step 1024). The toolbar and menu associated with the profile are then accessed (step 1026). Finally, only the system actions associated with the profile are loaded to the user's local computer (step 1028). The process then ends with the functionality for which the group is authorized being downloaded, i.e. the profile to which the group has been assigned.

Returning to step 1008, if the user's group has not been assigned to a profile, a determination is made as to whether a default profile has been designated by the system administrator (step 1010). If a default profile has been designated, the process again flows to step 1020, where the profile is accessed. From the profile, the action groups associated with the profile are determined (step 1022). System actions associated with the action groups are then determined (step 1024). The toolbar and menu associated with the profile are then accessed (step 1026). Finally, only the system actions associated with the profile are loaded to the user's local computer (step 1028). The process then ends with the functionality associated with the default profile being downloaded.

Returning the step 1010, if no default profile has been designated, the user cannot be downloaded any system actions. Therefore, an error is passed to the user (step 1012), and the process ends.

The above-described process is merely exemplary and not intended to limit the practice of the present invention. Other embodiments are possible. For instance, configuring the default profile with every available system action while limiting access to certain groups and individuals to certain system actions by assigning those groups and individuals to profiles having fewer system actions.

In an alternative embodiment, the user may belong to more than one group. In that embodiment, there must be designated group hierarchy, for instance, primary, secondary and tertiary group designating. The user would then have access to system actions based on the system administrator's approach to allocating security rights.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. This embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for role based allocation of security by profile configuration, comprising:

creating a profile for a user;

associating the profile with an application;

determining a level of functionality of the application, the application having multiple levels of functionality, based upon the profile; and downloading the determined level of functionality of the application into a computer, for subsequent execution by the user after the determined level of functionality of the application has been downloaded.

2. A data processing system implemented method for role based allocation of security by profile configuration, comprising:

customizing a profile, wherein the profile is associated with an application having a plurality of functions;

receiving a request for the application; and selectively downloading a subset of available functions of the application based on the profile into a computer, for subsequent execution by a user after the subset of available functions of the application has been downloaded.

3. The data processing system implemented method recited in claim 2, wherein customizing further comprises:

assigning the user to the profile;

assigning a plurality of system actions to the profile, wherein a given system action is used to invoke at least one function of the application; and assigning an action group to the profile, wherein the action group includes references to at least some of the plurality of system actions and define which system actions are available to the user.

4. The data processing system implemented method recited in claim 3, wherein downloading further comprises:

identifying the user from the request;

accessing the profile based on the user;

accessing the system action assigned to the profile; and defining functions of the application to be downloaded based on the system action.

5. The data processing system implemented method recited in claim 2 further comprises:

customizing a group profile;

assigning a group to the group profile; and assigning a system action to the group profile, wherein the system action is used to invoke at least one function of the application.

6. The data processing system implemented method recited in claim 5, wherein downloading further comprises:

identifying the user from the request;

determining whether the user is a member of the group;

accessing one of the profile and the group profile based on the user being a member of the group;

accessing the system action based on the group profile; and defining functions of the application to be downloaded based on the system action.

7. The data processing system implemented method recited in claim 6 further comprises:

defining a default profile; and assigning a system action to the default profile, wherein the system action is used to invoke at least function of the application.

8. The data processing system implemented method recited in claim 7, wherein downloading further comprises:

accessing one of the profile, the group profile and the default profile;

accessing the system action based on the default profile, and defining functions of the application to be downloaded based on the system action.

9. A data processing system implemented method for role based allocation of security by profile configuration, comprising:

receiving a request for an application from a user;

checking a plurality of profiles for a profile, wherein the user is assigned to the profile;

accessing one of the plurality of profiles;

accessing a system action based on the one of the plurality of profiles;

defining an executable application program based on the system action; and transferring the executable application program to the user.

10. The data processing system implemented method recited in claim 9, wherein the profile comprises security rights for the user.

11. The data processing system implemented method recited in claim 10, wherein subsequent to receiving a request, the method further comprises:

determining whether the user is a group member; and checking the plurality of profiles for a profile wherein the user is assigned to the profile.

12. The data processing system implemented method recited in claim 11, wherein the one of the plurality of profiles is assigned to the user's group.

13. The data processing system implemented method recited in claim 11, wherein the one of the plurality of profiles is assigned to the user.

14. The data processing system implemented method recited in claim 9, wherein subsequent to receiving, the method further comprises:

checking the plurality of profiles for a default profile, the default profile having a system action that is used to invoke at least function of the application.

15. The data processing system implemented method recited in claim 9, wherein one of the plurality of profiles is a default profile the default profile having a system action that is used to invoke at least function of the application.

16. A data processing system implemented method for role based allocation of security by profile configuration, comprising:

receiving a request for an application from a user;

iteratively checking a plurality of profiles for the user's profile, user group's profile, and default profile;

accessing one of the plurality of profiles based on the iterative checking;

accessing a system action based on the one of the plurality of profiles, wherein the system action invokes particular functions of the application; and transferring the system action to the user.

17. The data processing system implemented method recited in claim 16, wherein iterative checking is based on availability of a profile.

18. The data processing system implemented method recited in claim 16, wherein an outcome of the iterative checking is based on profile availability.

19. The data processing system implemented method recited in claim 16, wherein the outcome of iterative checking is based on a hierarchy of user's profile, user group's profile, and default profile.

20. The data processing system implemented method recited in claim 16, wherein the system action further comprises security rights.

21. A data processing system for role based allocation of security by profile configuration, comprising:

means for creating a profile for a user;

means for associating the profile with the application;

means for determining a level of functionality of an application, the application having multiple levels of functionality, based upon the profile; and means for downloading the determined level of functionality of the application into a computer, for subsequent execution by the user after the determined level of functionality of the application has been downloaded.

22. A data processing system for role based allocation of security by profile configuration, comprising:

customizing means for customizing a profile, wherein the profile is associated with an application having a plurality of functions;

receiving means for receiving a request for the application; and downloading means for selectively downloading a subset of available functions of the application based on the profile into a computer, for subsequent execution by a user after the subset of available functions of the application has been downloaded.

23. The data processing system recited in claim 22, wherein customizing further comprises:

assigning means for assigning the user to the profile;

assigning means for assigning a plurality of system actions to the profile, wherein the a given system action is used to invoke at least one function of the application, and assigning means for assigning an action group to the profile, wherein the action group includes references to at least some of the plurality of system actions and define which system actions are available to the user.

24. The data processing system recited in claim 23, wherein downloading further comprises:

identifying means for identifying the user from the request;

accessing means for accessing the profile based on the user;

accessing means for accessing the system action assigned to the profile; and means for defining functions of the application to be downloaded based on the system action.

25. The data processing system recited in claim 22 further comprises:

customizing means for customizing a group profile;

assigning means for assigning a group to the group profile; and assigning means for assigning a system action to the group profile, wherein the system action is used to invoke at least one function of the application.

26. The data processing system recited in claim 25, wherein downloading further comprises:

identifying means for identifying the user from the request;

determining means for determining whether the user is a member of the group;

accessing means for accessing one of the profile and the group profile based on the user being a member of the group;

accessing means for accessing the system action based on the group profile; and defining means for defining functions of the application to be downloaded based on the system action.

27. The data processing system recited in claim 26 further comprises:

defining means for defining a default profile; and assigning means for assigning a system action to the default profile, wherein the system action is used to invoke at least function of the application.

28. The data processing system recited in claim 27, wherein downloading further comprises:

accessing means for accessing one of the profile, the group profile and the default profile;

accessing means for accessing the system action based on the default profile; and defining means for defining functions of the application to be downloaded based on the system action.

29. A data processing system for role based allocation of security by profile configuration, comprising:

receiving means for receiving a request for an application from a user;

checking means for checking a plurality of profiles for a profile, wherein the user is assigned to the profile;

accessing means for accessing one of the plurality of profiles;

accessing means for accessing a system action based on the one of the plurality of profiles;

defining means for defining an executable application program based on the system action; and transferring means for transferring the executable application program to the user.

30. The data processing system recited in claim 29, wherein the profile comprises security rights for the user.

31. The data processing system recited in claim 30, wherein subsequent to receiving a request, the method further comprises:

determining means for determining whether the user is a group member; and checking means for checking the plurality of profiles for a profile wherein the user is assigned to the profile.

32. The data processing system recited in claim 31, wherein the one of the plurality of profiles is assigned to the user's group.

33. The data processing system recited in claim 31, wherein the one of the plurality of profiles is assigned to the user.

34. The data processing system recited in claim 29, wherein subsequent to receiving, the method further comprises:

checking means for checking the plurality of profiles for a default profile, the default profile having a system action that is used to invoke at least function of the application.

35. The data processing system recited in claim 29, wherein the one of the plurality of profiles is a default profile, the default profile having a system action that is used to invoke at least function of the application.

36. A data processing system for role based allocation of security by profile configuration, comprising:

receiving means for receiving a request for an application from a user;

checking means for iteratively checking a plurality of profiles for the user's profile, user group's profile, and default profile;

accessing means for accessing one of the plurality of profiles based on the iterative checking;

accessing means for accessing a system action based on the one of the plurality of profiles, wherein the system action invokes particular functions of the application; and transferring means for transferring the system action to the user.

37. The data processing system recited in claim 36, wherein iterative checking is based on availability of a profile.

38. The data processing system recited in claim 36, wherein an outcome of the iterative checking is based on profile availability.

39. The data processing system recited in claim 36, wherein the outcome of iterative checking is based on a hierarchy of user's profile, user group's profile, and default profile.

40. The data processing system recited in claim 36, wherein the system action further comprises security rights.

41. A computer program product in a computer readable media for use in a data processing system for role based allocation of security by profile configuration, comprising:

creating instructions for creating a profile for a user;

associating instructions for associating the profile with an application;

determining a level of functionality of the application, the application having multiple levels of functionality, based upon the profile; and downloading the determined level of instructions for downloading functionality of the application into a computer, for subsequent execution by the user after the determined level of functionality of the application has been downloaded.

42. A computer program product in a computer readable media for use in a data processing system for role based allocation of security by profile configuration, comprising:

customizing instructions for customizing a profile, wherein the profile is associated with an application having a plurality of functions;

receiving instructions for receiving a request for the application; and downloading instructions for selectively downloading a subset of available functions of the application based on the profile into a computer, for subsequent execution by a user after the subset of available functions of the application has been downloaded.

* * * * *

UNITED STATES PATENT AND TRADEMARK OFFICE
CERTIFICATE OF CORRECTION

PATENT NO. : 6,785,822 B1
DATED : August 31, 2004
INVENTOR(S) : Sadhwani-Tully

It is certified that error appears in the above-identified patent and that said Letters Patent is hereby corrected as shown below:

Column 6,
Line 16, after "editor" delete "assessed" and insert -- accessed --.
Line 38, after "tab" delete "408" and insert -- 410 --.

Column 7,
Line 5, after "action of" delete "work with the groups" and insert
-- Work with Groups --.

Column 8,
Line 43, after "configuration" delete "dialogue" and insert -- dialog --.

Column 12,
Line 47, after "a default profile" insert -- , --.

Column 13,
Line 35, after "wherein" delete "the".

Signed and Sealed this

Seventh Day of February, 2006

JON W. DUDAS
*Director of the United States Patent and Trademark Office*